(12) United States Patent
Chaumet et al.

(10) Patent No.: US 11,098,753 B2
(45) Date of Patent: Aug. 24, 2021

(54) END-FITTING FOR INDUSTRIAL MACHINE ROLLERS

(71) Applicant: EPSILON COMPOSITE, Gaillan en Medoc (FR)

(72) Inventors: Yann Chaumet, Gaillan en Médoc (FR); Yann Barbot, Avensan (FR)

(73) Assignee: EPSILON COMPOSITE, Gaillan en Medoc (FR)

( * ) Notice: Subject to any disclaimer, the term of this patent is extended or adjusted under 35 U.S.C. 154(b) by 0 days.

(21) Appl. No.: 16/758,595

(22) PCT Filed: Aug. 16, 2018

(86) PCT No.: PCT/FR2018/052069
§ 371 (c)(1),
(2) Date: Apr. 23, 2020

(87) PCT Pub. No.: WO2019/081823
PCT Pub. Date: May 2, 2019

(65) Prior Publication Data
US 2021/0180646 A1 Jun. 17, 2021

(30) Foreign Application Priority Data
Oct. 26, 2017 (FR) ...................................... 1760117

(51) Int. Cl.
*F16C 13/00* (2006.01)
*B41F 13/10* (2006.01)
*B41F 13/18* (2006.01)

(52) U.S. Cl.
CPC .............. *F16C 13/00* (2013.01); *B41F 13/10* (2013.01); *B41F 13/18* (2013.01); *F16C 2202/32* (2013.01); *F16C 2324/16* (2013.01)

(58) Field of Classification Search
CPC ............................... B41F 27/1281; B41F 5/24
See application file for complete search history.

(56) References Cited

U.S. PATENT DOCUMENTS 3,135,319 A * 6/1964 Richards ................. C03B 13/16
165/89
4,050,510 A * 9/1977 Theysohn ................. F28F 5/02
165/89

(Continued)

FOREIGN PATENT DOCUMENTS

DE 1575639 A1 1/1970
FR 2227507 A1 11/1974

OTHER PUBLICATIONS

International Search Report for corresponding application PCT/FR2018/052069 filed Aug. 16, 2018; dated Oct. 16, 2018.

*Primary Examiner* — Jason L Vaughan
(74) *Attorney, Agent, or Firm* — Cantor Colburn LLP

(57) ABSTRACT

An end piece suitable for forming a spacer for a roll having two concentric tubes with axis, including spokes connecting two inner and outer cylindrical portions, and is where a fluid circuit originating from the center towards the periphery includes a first circumferential groove arranged in the inner cylindrical portion and a second circumferential groove arranged in the outer cylindrical portion connected by at least one pipe, such that the end piece makes it possible to reduce the weight of the roll by approximately 20%, to facilitate the balancing of the roll while ensuring accessibility to the inside of the roll between the two tubes and to enable easy mounting without indexing due to the circumferential grooves, and where the end piece with spokes enables access to the inside of the roll when it is mounted and thus enables both more accurate balancing than with solid end pieces that require the piercing of the outer tube and the invisibility of this balancing from the outside of the roll.

18 Claims, 7 Drawing Sheets

(56) References Cited

U.S. PATENT DOCUMENTS

| | | | | | |
|---|---|---|---|---|---|
| 4,651,643 | A | * | 3/1987 | Katz | B41F 27/105 |
| | | | | | 101/375 |
| 4,712,475 | A | * | 12/1987 | Kemmerer | B41F 31/002 |
| | | | | | 101/348 |
| 5,072,497 | A | * | 12/1991 | Zaoralek | F16C 13/00 |
| | | | | | 492/46 |
| 5,285,844 | A | * | 2/1994 | Schneid | B21B 27/08 |
| | | | | | 100/336 |
| 5,370,177 | A | * | 12/1994 | Fey | D21G 1/0266 |
| | | | | | 165/89 |
| 5,451,198 | A | * | 9/1995 | Lancaster | B05C 1/022 |
| | | | | | 226/191 |
| 5,507,228 | A | * | 4/1996 | Schulz | B41F 27/105 |
| | | | | | 101/375 |
| 5,725,466 | A | * | 3/1998 | Eppli | D21G 1/0266 |
| | | | | | 165/89 |
| 5,904,095 | A | * | 5/1999 | Nelson | B41F 27/105 |
| | | | | | 101/375 |
| 6,095,237 | A | * | 8/2000 | Haag | D21F 5/027 |
| | | | | | 165/86 |
| 6,276,271 | B1 | * | 8/2001 | Busshoff | B41F 13/10 |
| | | | | | 101/375 |
| 6,394,943 | B1 | * | 5/2002 | Cormier | B41F 27/105 |
| | | | | | 101/375 |
| 6,401,615 | B1 | * | 6/2002 | Heinicke | B41C 1/182 |
| | | | | | 101/389.1 |
| 6,436,022 | B1 | * | 8/2002 | Zaoralek | D21G 1/0266 |
| | | | | | 492/46 |

* cited by examiner

END-FITTING FOR INDUSTRIAL MACHINE ROLLERS

TECHNICAL FIELD

The present disclosure relates to an end piece suitable for forming a spacer between two tubes, forming a roll used particularly as a printing roll, in particular for flexography. The two tubes are an inner tube and an outer tube, the inner tube consisting of the rotating shaft of the roll or a separate tube from the rotating shaft.

BACKGROUND

Printing rolls exist that consist of two substantially concentric cylindrical tubes; the inner tube, arranged on a shaft, forms a guide tube, while the outer tube is used for printing.

The two tubes must have a consistent distance between them in order to ensure smooth rotation of the roll, and an end piece is placed at each end or ribs are arranged longitudinally between the two tubes. The roll must also be balanced in order to prevent any imbalance during rotation, and it can be necessary to add counterweights inside the roll. The rolls are often large, for example having a diameter of 75 to 1,000 mm and a length of 500 mm to 5,000 mm, and are therefore very heavy, for example 10 to 500 kg.

The two tubes are rigidly connected to each other by gluing the end pieces or by the longitudinal ribs, and it is not therefore possible to replace the guide tube without destroying it. If end pieces are used, part of the end piece (the inner diameter) must be removed and the guide tube must be destroyed on extraction. The glue must then be removed, a new tube put in position and glued, and the end piece restored to operational condition by adding a new part.

Flexographic printing rolls require an air circuit inside the roll. The air arrives through the shaft in the centre of the roll and must be directed towards nozzles, distributed on the surface of the outer tube. The nozzles are supplied with air by hoses placed outside the tube and connecting the nozzles to the spacer. Usually, the end pieces are used to convey the air directly from the inner diameter of the end piece towards the outer diameter of the roll, through a radial hole in the end piece. It is thus necessary to provide for the angular indexing of the end piece on the air supply and on the channels of the outer tube.

Usually, the air circuit in the end piece is achieved by piercing said end piece. However, these holes are difficult to size and they can become blocked, and it is not possible to obtain small diameters.

Printing rolls also exist that comprise a shaft connected to two concentric tubes, a porous outer tube and an inner tube with peripheral grooves open on the outer surface thereof. The two rolls are very close together, connected to the shaft, and together form the printing roll as such. The peripheral grooves form, with the inner surface of the outer tube, ink delivery ducts. The ink is delivered from the centre towards the periphery by passages made in a cylinder head between channels machined on the surface of a disc and covered with a screwed plate. This solution is unsatisfactory as the cylinder head is quite heavy and does not ensure satisfactory sealing, particularly if the fluid is under a certain amount of pressure, and forming the printing roll from two concentric rolls further increases the weight of the assembly. This solution is also costly and complex to implement, but does not ensure that the printing surface is flat due to the significant deformability of the porous surface of the outer tube.

BRIEF SUMMARY

The disclosure proposes an end piece that is light and rigid, enables easy removal of the inner tube, can be mounted without indexing, is sealed against fluids such as air, and enables easy balancing.

The disclosure also relates to a roll comprising said end piece.

The end piece according to the disclosure is suitable for forming a spacer for a roll consisting of two concentric tubes with axis xx', and comprises spokes connecting two inner and outer cylindrical portions; it is characterized in that a fluid circuit originating from the centre towards the periphery comprises a first circumferential groove arranged in the inner cylindrical portion and a second circumferential groove arranged in the outer cylindrical portion connected by at least one pipe. This end piece makes it possible to reduce the weight of the roll by 20 to 70%, preferably 20 to 50%, and to facilitate the balancing of the roll while ensuring accessibility to the inside of the roll between the two tubes, and to enable easy mounting without indexing due to the circumferential grooves. An end piece with spokes enables access to the inside of the roll when it is mounted and thus enables both more accurate balancing than with solid end pieces that require the piercing of the outer tube and the invisibility of this balancing from the outside of the roll.

Advantageously, the fluid is compressed air. Due to its construction, the disclosure ensures sealing against pressurized air.

Advantageously, the end piece comprises a ring in the inner cylindrical portion. This ring acts as a stop for the inner tube and ensures that it is coaxial with the outer tube. It is thus possible to remove the inner tube reversibly, unlike in the solutions in which the inner tube is glued, which require the destruction of the end piece and/or the tube. The ring can for example be made from stainless steel.

Advantageously, the end piece is covered with a ring made from an electrically conductive non-metallic material, such as a composite for example. This makes it possible to meet an anti-static criterion, for example >1 Mohm per 100 Volts. The non-metallic material prevents the galvanic corrosion of the end piece if it is made from steel and enables continuity of material with the outer tube when it is made from a composite material. The use of an RFID chip in the printing plate requires a non-metallic surface for the registering and positioning thereof on the printing roll. Advantageously, the pipe is arranged between two spokes. The pipe then consists of a tube, for example cylindrical, that can be attached to the end piece. The use of a tube instead of a hole makes it possible to improve the control of the dimensions of the duct; it is easier to obtain precise diameters on a tube than with a hole. The use of tubes also makes it possible to reduce the size of the fins, which no longer need to convey air, as much as possible.

Advantageously, the end piece comprises two pipes. The distribution of the fluid in the roll is thus better balanced.

Advantageously, the composite ring comprises an axial hole connected to the second circumferential groove. This hole can be pierced in any location on the periphery of the composite ring, which makes it possible to pierce the number of holes necessary to supply the outer tube with fluid or air. It is possible to arrange channels inside the outer tube and therefore supply these channels with fluid or air by means of the ducts connecting the centre of the roll to the outer tube.

Advantageously, the second circumferential groove is arranged in the composite ring. The second circumferential groove is thus situated as close to the outer tube as possible.

Advantageously, the first circumferential groove is arranged in a central ring of the inner cylindrical portion. The first circumferential groove is thus arranged as close to the fluid intake as possible.

Advantageously, the end piece is made from a composite. The production of a 100% composite end piece makes it possible to further reduce the weight of the roll.

Advantageously, the spokes consist of fins. These fins can for example be made by machining a part, by casting or by composite moulding.

Advantageously, the spokes consist of mesh. The spokes or fins can be made by 3D printing of a composite or other material.

The disclosure also relates to a roll consisting of two concentric outer and inner tubes with axis xx'; it is characterized in that it comprises at least one end piece with at least one of the previous features. The roll provided with this type of end piece is thus lighter and sealed. The inner tube can consist of a drive shaft or a specific tube such as a guide tube.

Advantageously, the tubes are made from composite materials. This material has the advantage of being particularly light.

Advantageously, the outer tube is fastened to the end piece. The outer tube is for example glued to the end piece.

Advantageously, the inner tube is removably mounted on the end piece. As each end piece comprises a removable ring that acts as a stop, it is possible to extract it and thus release the inner tube.

Advantageously, the outer tube is partially porous. The outer printing tube must be able to allow the air through; to this end, it must either comprise one or more channels arranged in the composite material, or consist of a partially porous composite. The air can be conveyed inside the outer tube according to FR 2 847 847, for example, by leaving gaps empty of resin, which does not increase the weight and ensures the sealing, balancing and even distribution over the length of said tube. It is also possible in this example to replace some of the carbon with a low-density material >1, such as a structural foam for example, to ensure an improved weight/stiffness ratio.

Advantageously, the roll comprises an end piece with an indexing shim. This shim enables the indexing of the printing plates, for example.

The rolls according to the disclosure can be used for:
Printing machines,
Woven and non-woven textile machines,
Plastic, film and paper machines,
Guide rolls,
Conveyor systems.

BRIEF DESCRIPTION OF THE DRAWINGS

Further advantages may become apparent to a person skilled in the art on reading the examples below, illustrated by the attached figures, given by way of example.

DETAILED DESCRIPTION

Figure 1:
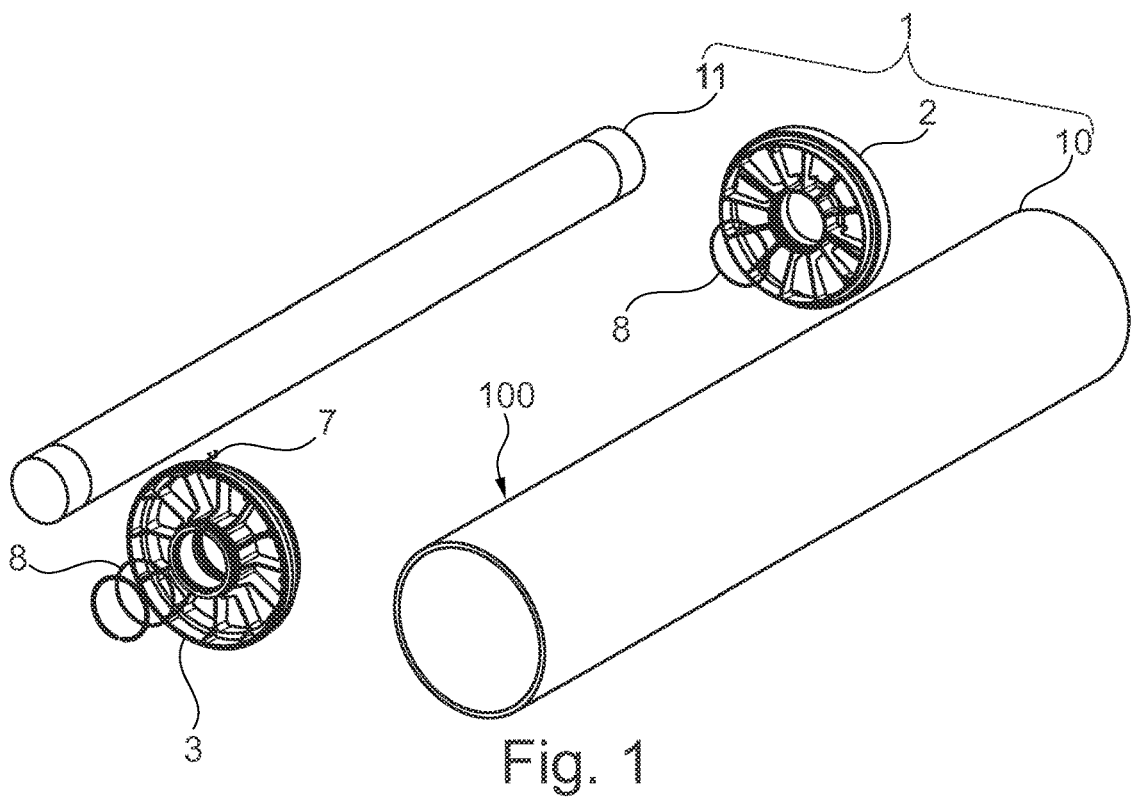
FIG. 1 is an exploded perspective view of a roll with two end pieces including one according to the disclosure.

The roll 1 illustrated in FIG. 1 consists of two tubes 10 and 11 mounted concentrically. The outer tube 10 has a larger diameter than the inner tube 11. The roll 1 also includes two end pieces 2 and 3 arranged on each side and ensuring a consistent gap between the two tubes. The tubes 10 and 11, together with the end pieces 2 and 3, are aligned along an axis xx' when they are mounted.

The outer tube 10 has one or more fluid or air distribution channels running through it, emerging into nozzles 100. The outer tube 10 can, for example, include a porous layer for distributing the air.

Figure 2:
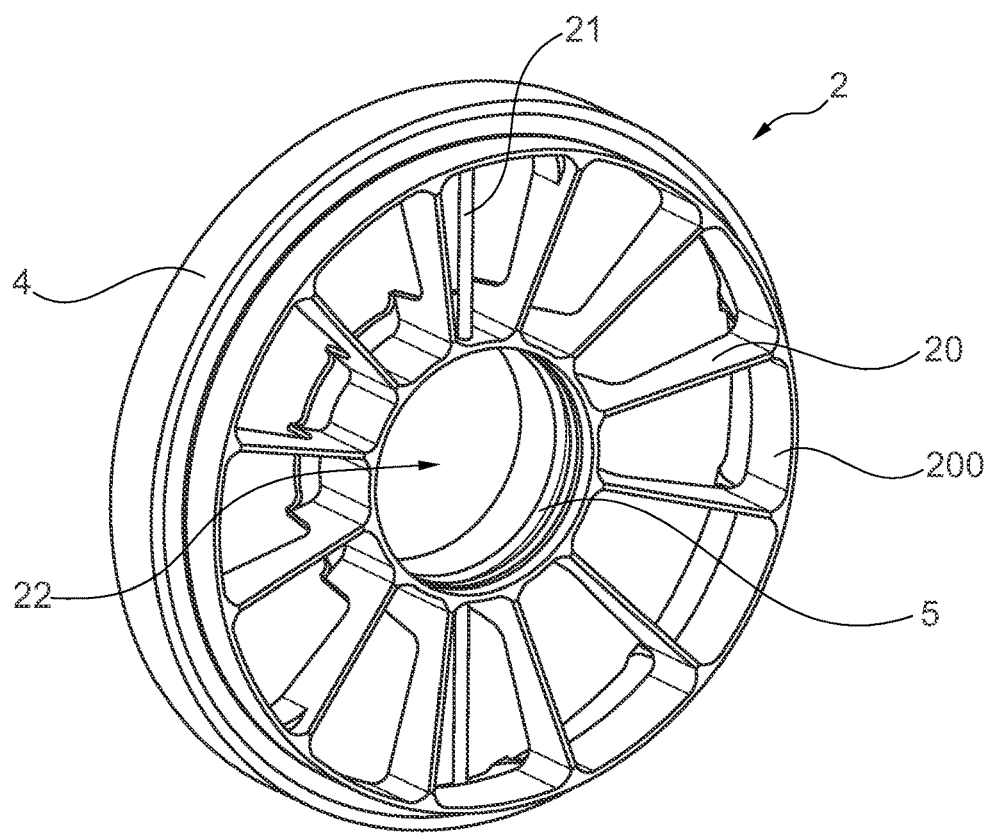
FIG. 2 is a perspective view of an end piece according to the disclosure from the inside of the roll.
Figure 3:
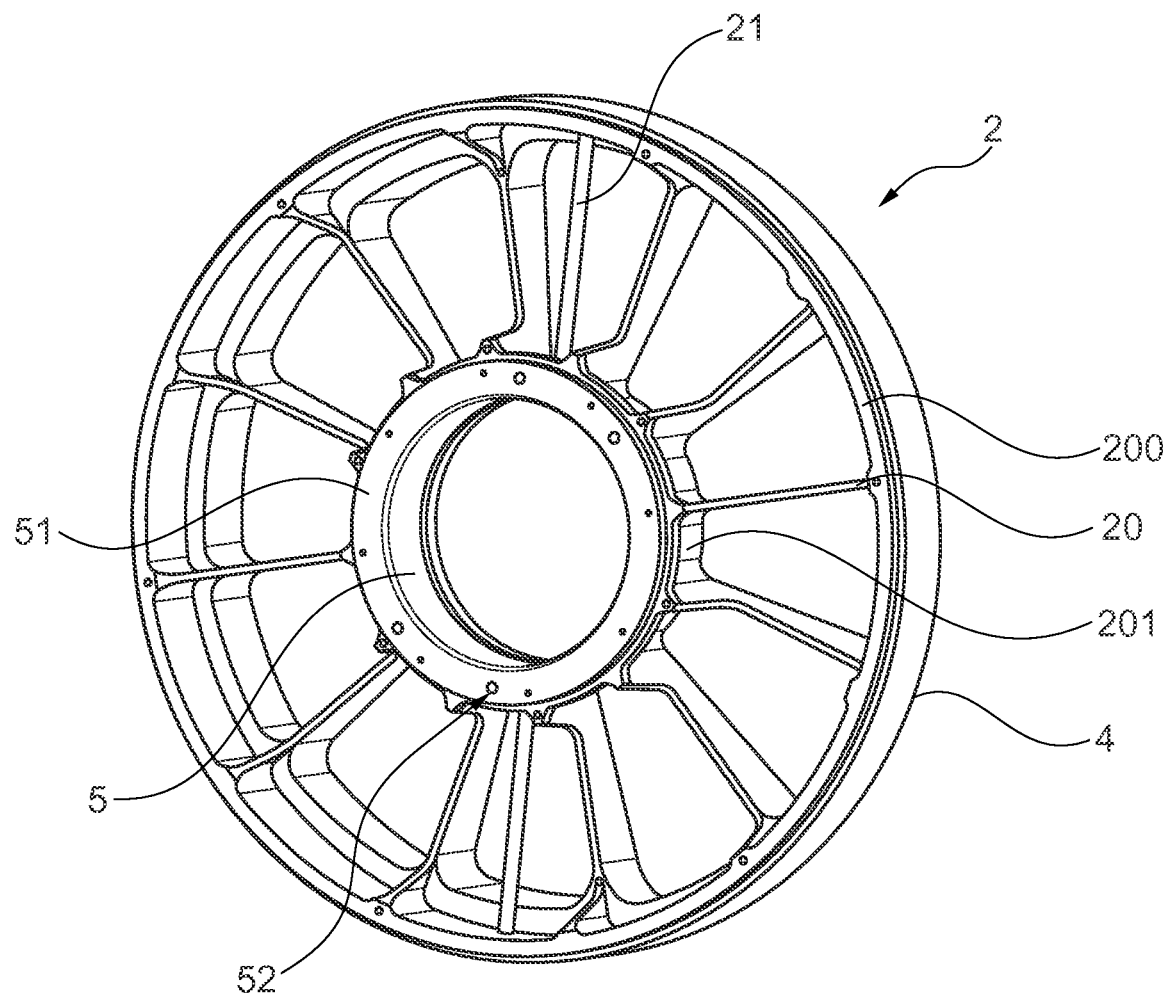
FIG. 3 is a perspective view of an end piece according to the disclosure from the outside of the roll.

The end piece 2, seen in more detail in FIGS. 2 and 3, comprises spokes 20 connecting two inner 201 and outer 200 cylindrical portions and arranged equidistantly, and two pipes 21 placed symmetrically relative to the axis xx'. The pipes 21 can be made from aluminium, for example. The end piece 2 is covered with a composite ring 4 placed and glued on the periphery of said end piece 2. It is open at its centre by means of a hole 22 in which a central ring 5 is arranged.

The spokes 20 are notched and/or bevelled in order to reduce the weight of the end piece 2 as much as possible.

The end piece 2 has a peripheral recess 23 enabling the positioning and gluing of the outer tube 10.

The composite ring 4 is provided with a first circumferential groove 41 in its inner portion and is pierced by at least one axial hole 40 oriented along the axis xx' and connected to the circumferential groove 41 on one side and to a fluid or air channel arranged in the outer tube 10 on the other side. It is also pierced by a radial nozzle 42. In this example, the first circumferential groove 41 is closed on three of its sides by the composite ring 4; it could be closed on just two sides, the third being closed by the outer tube 10, without departing from the scope of the disclosure.

The central ring 5 has a second circumferential groove 50 at one of its ends that is oriented towards the outside; the other end is provided with a peripheral shoulder 51 pierced by a hole 52 suitable for receiving a screw 53 for fastening said ring 5. The second circumferential groove 50 is open in order to let the air through.

Figure 4:
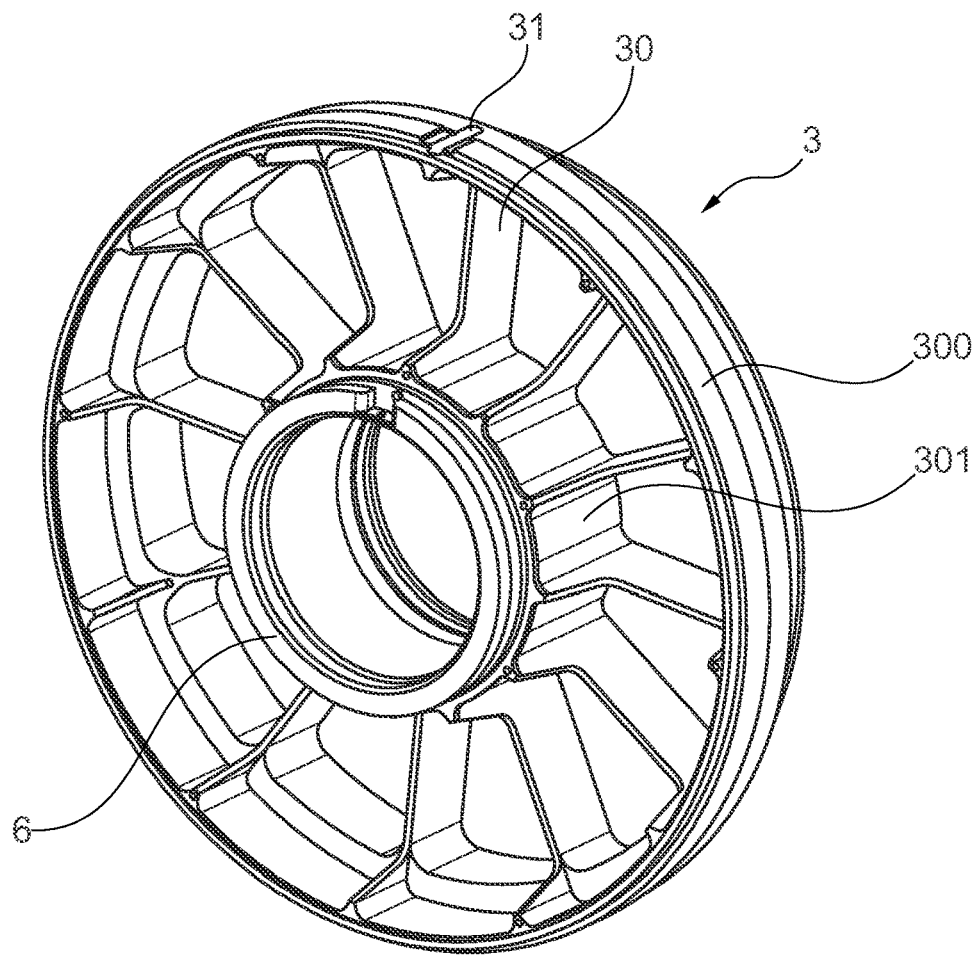
FIG. 4 is a perspective view of the second end piece of the roll from the outside.
Figure 4A:
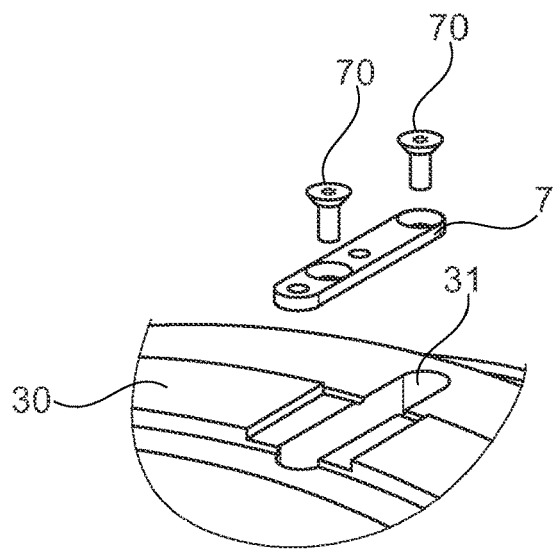
FIG. 4A is a detail of the shim of the second end piece.
Figure 5:
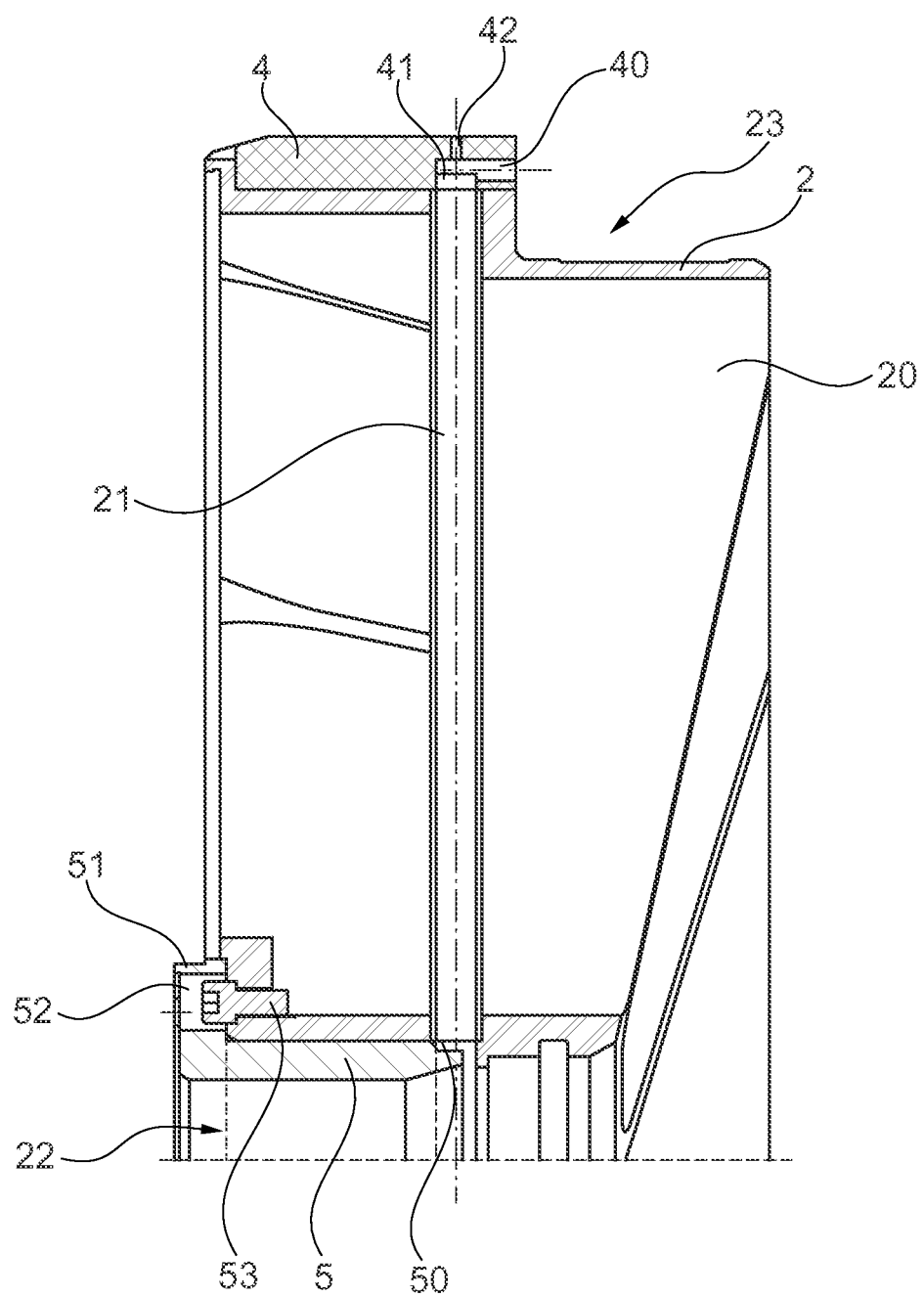
FIG. 5 is a cross-section of the end piece according to the disclosure in line with the air duct.
Figure 6:
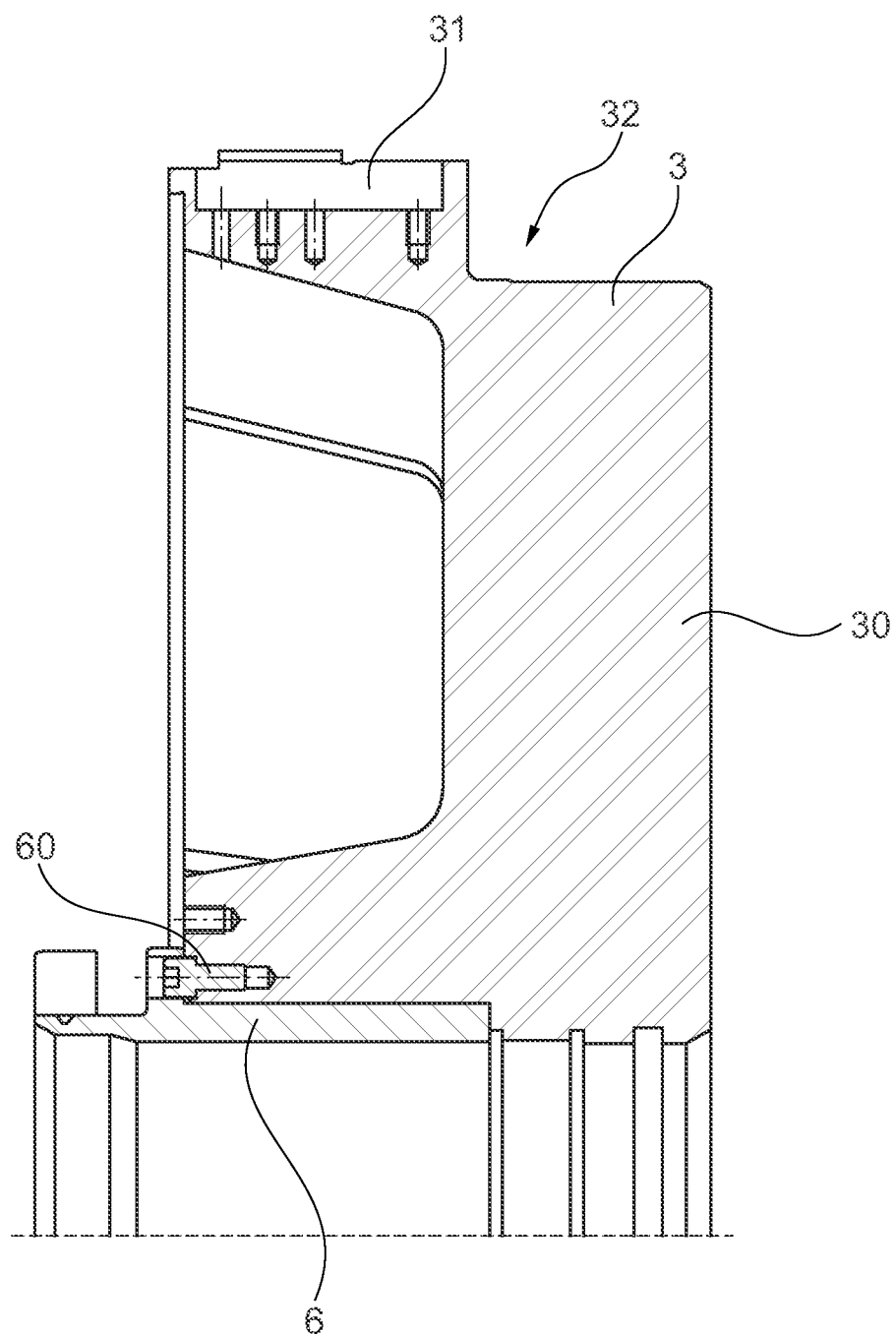
FIG. 6 is a cross-section of the second end piece in line with the shim.

The second end piece 3, illustrated in FIGS. 4 and 6, comprises spokes 30 connecting two inner 301 and outer 300 cylindrical portions and arranged equidistantly, and a second central ring 6. The end piece 3 is machined axially on its periphery to form a slot 31 for arranging a shim 7. The bottom of the slot 31 can be strippable in order to enable the height adjustment of the shim 7. The shim 7 is fastened by two screws 70 to the second end piece 3. The shim makes it possible to index the printing plates.

The spokes 30 are notched and/or bevelled in order to reduce the weight of the second end piece 3 as much as possible.

The second end piece 3 has a peripheral recess 32 enabling the positioning and gluing of the other end of the outer tube 10.

The central ring 6 is connected to the second end piece 3 by means of screws 60.

The end pieces 2 and 3 each have a removable ring 5 and 6 that make it possible to immobilize the inner tube 11 and change it by unscrewing the screws 53 and 60 and extracting the rings 5 and 6.

Seals 8 are placed in circular grooves between the rings 5 and 6 and the ends of the inner tube 11 in order to ensure sealing.

The way in which the roll according to the disclosure is mounted will now be described.

The end pieces 2 and 3 are glued to each end of the outer tube 10, seals 8 are arranged inside each end piece 2 and 3, the second ring 6 is positioned and screwed onto the second end piece 3, the inner tube 11 is slid into the end piece 2 and the outer tube 10 until it abuts against the second ring 6, and then the ring 5 is fastened to the end piece 2. It is possible to position the ring 5 first, then the inner tube 11 and the second ring 6.

In order to remove the inner tube 11, one of the screws 53 or 60 must simply be unscrewed in order to take out one of the rings 5 or 6 and extract the tube 11 to change it.

Figure 7:
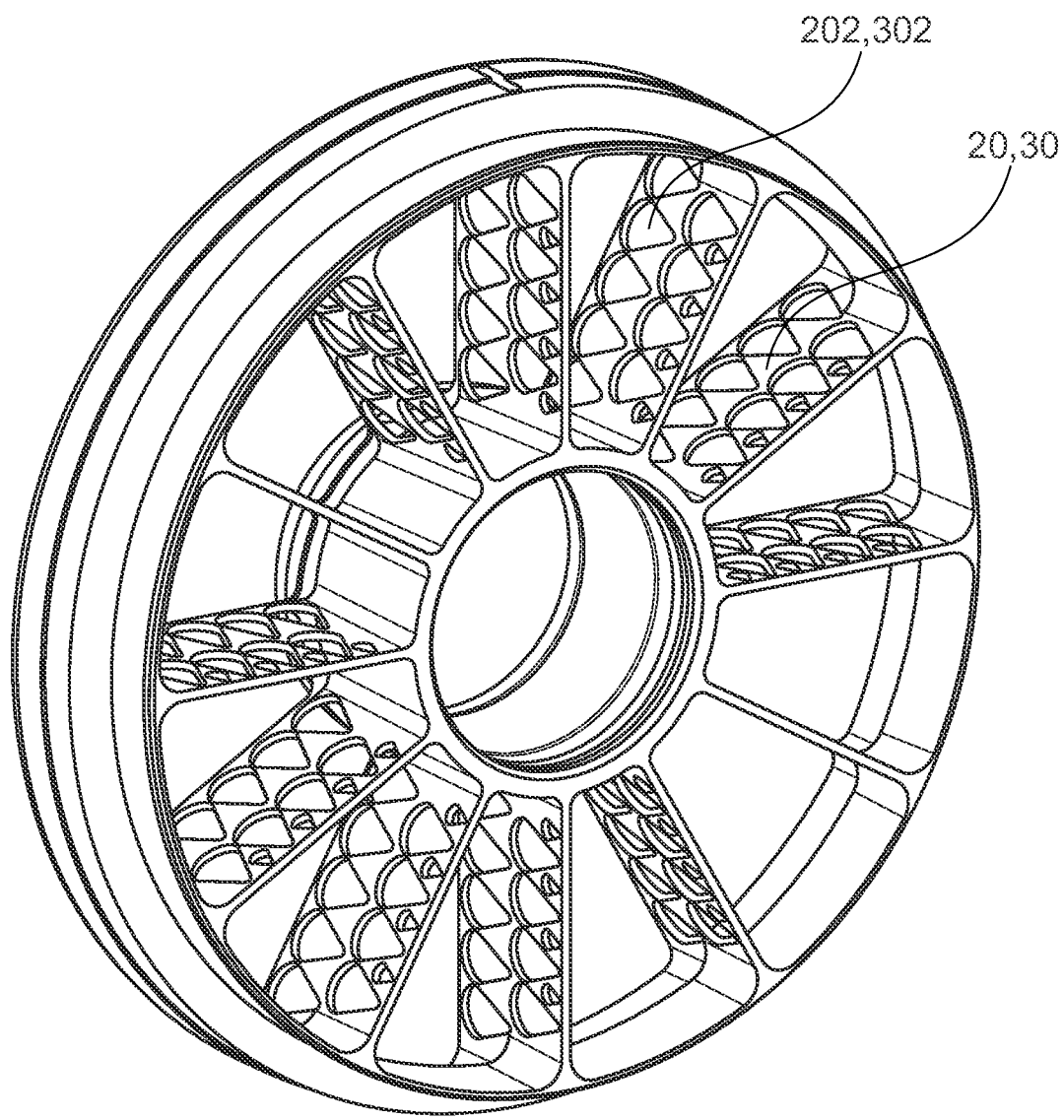
FIG. 7 is a perspective view of a first variant of the disclosure.

The first variant illustrated in FIG. 7 comprises spokes 20 and 30 pierced by tear drop shaped holes 202 and 302; other hole shapes could be envisaged. These holes are for example produced by machining.

Figure 8:
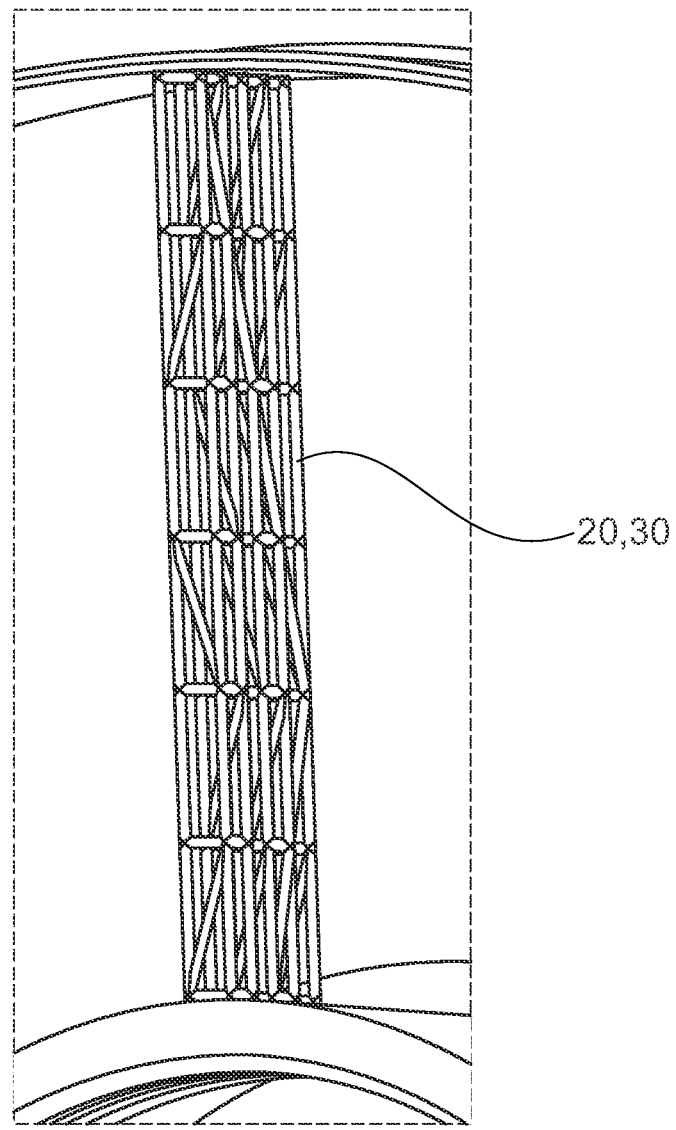
FIG. 8 is a detail of a spoke according to a second variant of the disclosure.

In the second variant illustrated in FIG. 8, the spokes 20, 30 are produced in the form of mesh.

The spokes 20 and 30 of the first and second variants will preferably be produced by additive manufacturing such as 3D printing.

The invention claimed is:

1. End piece suitable for forming a spacer for a roll comprising two concentric tubes with axis xx' and comprising spokes connecting inner and outer cylindrical portions, wherein a fluid circuit originating from the center towards the periphery comprises a first circumferential groove arranged in the inner cylindrical portion and a second circumferential groove arranged in the outer cylindrical portion connected by at least one pipe.

2. End piece according to claim 1, wherein the fluid is compressed air.

3. End piece according to claim 1, further comprising a ring in the inner cylindrical portion.

4. End piece according to claim 1, wherein the end piece is covered by a ring made from an electrically conductive non-metallic material.

5. End piece according to claim 1, wherein the pipe is arranged between two spokes.

6. End piece according to claim 1, further comprising two pipes.

7. End piece according to claim 4, wherein the ring made from electrically conductive non-metallic material comprises an axial hole connected to the second circumferential groove.

8. End piece according to claim 3, wherein the second circumferential groove is arranged in the composite ring.

9. End piece according to claim 1, wherein the first circumferential groove is arranged in a central ring of the inner cylindrical portion.

10. End piece according to claim 1, wherein the end piece is made from a composite.

11. End piece according to claim 1, wherein the spokes consist comprise fins.

12. End piece according to claim 1, wherein the spokes comprise mesh.

13. Roll comprising two concentric outer and inner tubes with axis xx', and one end piece according to claim 1.

14. Roll according to claim 13, wherein the tubes are made from composite materials.

15. Roll according to claim 13, wherein the outer tube is fastened to the end piece.

16. Roll according to claim 13, wherein the inner tube is removably mounted on the end piece.

17. Roll according to claim 13, wherein the outer tube is partially porous.

18. Roll according to claim 13, further comprising an end piece with an indexing shim.

* * * * *